United States Patent
Maltz et al.

(10) Patent No.: US 9,286,554 B1
(45) Date of Patent: Mar. 15, 2016

(54) SYSTEM AND METHOD FOR HALFTONE PRINTING IN A THREE-DIMENSIONAL OBJECT PRINTER

(71) Applicant: Xerox Corporation, Norwalk, CT (US)

(72) Inventors: Martin S. Maltz, Rochester, NY (US); Roger L. Triplett, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/676,439

(22) Filed: Apr. 1, 2015

(51) Int. Cl.
| | |
|---|---|
| G06K 15/02 | (2006.01) |
| H04N 1/034 | (2006.01) |
| H04N 1/405 | (2006.01) |
| H04N 1/52 | (2006.01) |
| B29C 67/00 | (2006.01) |
| G06K 15/10 | (2006.01) |
| H04N 1/60 | (2006.01) |

(52) U.S. Cl.
CPC ........ *G06K 15/1881* (2013.01); *B29C 67/0059* (2013.01); *B29C 67/0088* (2013.01); *G06K 15/102* (2013.01); *G06K 15/1878* (2013.01); *H04N 1/034* (2013.01); *H04N 1/405* (2013.01); *H04N 1/52* (2013.01); *H04N 1/6072* (2013.01)

(58) Field of Classification Search
None
See application file for complete search history.

(56) References Cited

U.S. PATENT DOCUMENTS

| | | | |
|---|---|---|---|
| 6,375,874 B1 | 4/2002 | Russell et al. | |
| 8,619,331 B2 * | 12/2013 | Qiao | G03G 15/6585 358/3.06 |
| 8,804,194 B2 * | 8/2014 | Saito | H04N 1/54 358/1.9 |
| 8,941,899 B2 * | 1/2015 | Qiao | B44C 1/18 358/518 |
| 8,995,022 B1 * | 3/2015 | Vronsky | H01L 21/02288 358/3.06 |
| 2002/0079601 A1 | 6/2002 | Russell et al. | |
| 2010/0007692 A1 | 1/2010 | Vanmaele et al. | |
| 2011/0285054 A1 | 11/2011 | Eliahu | |
| 2012/0189776 A1 * | 7/2012 | Robinson | G06K 15/002 427/265 |
| 2014/0205813 A1 * | 7/2014 | Torigoe | B44F 11/02 428/172 |
| 2014/0277661 A1 | 9/2014 | Amadio et al. | |

* cited by examiner

*Primary Examiner* — Scott A Rogers
(74) *Attorney, Agent, or Firm* — Maginot Moore & Beck LLP

(57) ABSTRACT

A method of forming halftone printed images in a three-dimensional printer includes generating halftone coverage data for a region of an image receiving surface including at least one color marking agent and a color neutral marking agent. The method further includes generating halftone image data with reference to the halftone coverage data and operating a plurality of ejectors to form a printed halftone image having a uniform thickness. A first pixel location receives a first color marking agent and at least a second pixel location receives the color neutral marking agent.

14 Claims, 3 Drawing Sheets ively connected to the plurality of ejectors and
SYSTEM AND METHOD FOR HALFTONE PRINTING IN A THREE-DIMENSIONAL OBJECT PRINTER

TECHNICAL FIELD

This disclosure is directed to three-dimensional object printing systems and, more particularly, to systems and methods for printing halftone images that are formed on the surfaces or other regions of three-dimensional printed objects.

BACKGROUND

Three-dimensional printing, also known as additive manufacturing, is a process of making a three-dimensional solid object from a digital model of virtually any shape. Many three-dimensional printing technologies use an additive process in which successive layers of the part are built on top of previously deposited layers. Some of these technologies use inkjet printing, where one or more printheads eject successive layers of material. Three-dimensional printing is distinguishable from traditional object-forming techniques, which mostly rely on the removal of material from a work piece by a subtractive process, such as cutting or drilling.

In addition to forming three-dimensional objects with different shapes, some three-dimensional printers also form printed images on one or more surfaces of the object. The printed images are, for example, decorative or include printed images and text indicia that label or provide instructions for the use of the three-dimensional printed object. A three-dimensional object printer can be configured to eject drops of various types of ink to form the printed images, including both monochrome and multicolor images, using halftone printing techniques that are well known to the art.

Existing halftone printing techniques are unsuitable for many three-dimensional printing scenarios because the halftone printing process produces a layer of printed ink with a non-uniform thickness since regions of the printed image that receive ink drops are thicker than the regions of the image that remain blank. The printer cannot form additional layers of build material over the halftone printed image in a reliable manner since the halftone image does not provide layers with uniform thickness to support additional layers of build material in the object. Additionally, filling in the entire region with ink to form a uniform layer greatly reduces the accuracy of the halftone color patterns and greatly reduces the quality of printed images. Consequently, improvements to the operation of three-dimensional object printers to enable halftone printing and enable the formation of additional layers of material over halftone printed images would be beneficial.

SUMMARY

In one embodiment, a method of operating a three-dimensional object printer to form halftone printed images has been developed. The method includes receiving with a controller contone image data, generating with the controller relative halftone coverage data corresponding to proportions of each marking agent in a plurality of marking agents that form a halftone pattern on an image receiving surface that corresponds to the contone image data, the plurality of marking agents including at least a first color marking agent and a color neutral marking agent, generating with the controller halftone image data corresponding to each pixel location in a plurality of pixel locations on a region of the image receiving surface with reference to the relative halftone coverage data, and operating with the controller a plurality of ejectors in a print zone of the printer to eject one marking agent in the plurality of marking agents onto each pixel location in the plurality of pixel locations in the region of the image receiving surface with reference to the halftone image data to form a printed halftone image having a uniform thickness in the region of the image receiving surface, at least a first pixel location receiving the first color marking agent and at least a second pixel location receiving the color neutral marking agent.

In another embodiment, a three-dimensional object printer that is configured to print halftoned images on a three-dimensional printed object has been developed. The method includes a plurality of ejectors configured to eject drops of at least a first color marking agent and a color neutral marking agent onto an image receiving surface in a print zone, a memory configured to store contone image data, and a controller operatthe memory. The controller is configured to receive the contone image data from the memory, generate relative halftone coverage data corresponding to proportions of each marking agent in the plurality of marking agents that form a halftone pattern on the image receiving surface that corresponds to the contone image data, generate halftone image data corresponding to each pixel location in a plurality of pixel locations on a region of the image receiving surface with reference to the relative halftone coverage data, and operate the plurality of ejectors to eject one marking agent in the plurality of marking agents onto each pixel location in the plurality of pixel locations in the region of the image receiving surface with reference to the halftone image data to form a printed halftone image having a uniform thickness in the region of the image receiving surface, at least a first pixel location receiving the first color marking agent and at least a second pixel location receiving the color neutral marking agent.

BRIEF DESCRIPTION OF THE DRAWINGS

The foregoing aspects and other features of an apparatus or printer that forms halftone images with uniform material thickness layers on three-dimensional objects are explained in the following description, taken in connection with the accompanying drawings.

DETAILED DESCRIPTION

Figure 1:
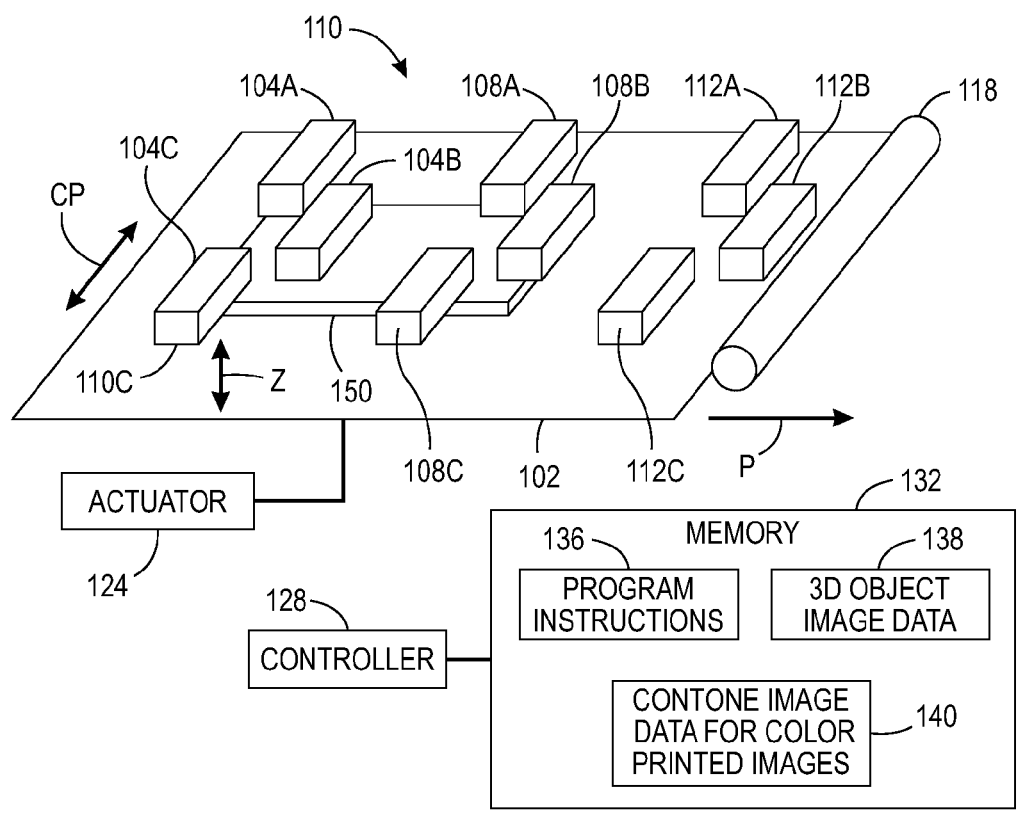
FIG. 1 is a diagram of a three-dimensional object printer.

For a general understanding of the environment for the device disclosed herein as well as the details for the device, reference is made to the drawings. In the drawings, like reference numerals designate like elements.

As used herein, the term "build material" refers to a material that is ejected in the form of liquid drops from a plurality of ejectors in one or more printheads to form layers of material in an object that is formed in a three-dimensional object printer. Examples of build materials include, but are not limited to, thermoplastics, UV curable polymers, and binders that can be liquefied for ejection as liquid drops from ejectors in one or more printheads and subsequently hardened into a solid material that forms an object through an additive three-dimensional object printing process. In some three-dimensional object printer embodiments, multiple forms of build material are used to produce an object. In some embodiments, different build materials with varying physical or chemical characteristics form a single object. In other embodiments, the printer is configured to eject drops of a single type of build material that incorporates different colors through dyes or other colorants that are included in the build material. The three-dimensional object printer controls the ejection of drops of build materials with different colors to form objects with varying colors and optionally with printed text, graphics, or other single and multi-color patterns on the surface of the object.

As used herein, the term "support material" refers to another material that is ejected from printheads during a three-dimensional object printing process to stabilize the object that is formed from the build materials. For example, as the three-dimensional object printer applies layers of the build material to form the object, at least one printhead in the printer also ejects layers of the support material that engage portions of the object. The support material holds one or more sections of the build material in place before the object constructed with the build material is a complete object and supported because it is a single object. A simple example of the use of support material includes construction of a cane using the three-dimensional object printer. The arched part of the cane is at the top of the object, and the support material provides support for the downward pointing part of the handle prior to completion of the top of the arch in the cane. The support material also prevents newly formed features from breaking before sufficient build material is present to hold the object together, and prevents portions of the build material that have not fully solidified from flowing out of position before the hardening process is completed. Examples of support material include, but are not limited to, waxy materials that provide support to the object during the printing process and that can be removed from the object easily after the printing process is completed.

As used herein, the term "process direction" refers to a direction of movement of a support member past one or more printheads during a three-dimensional object formation process. The support member holds the three-dimensional object and accompanying support material and building material during the print process. In some embodiments, the support member is a planar member such as a metal plate, while in other embodiments the support member is a rotating cylindrical member or a member with another shape that supports the formation of an object during the three-dimensional object printing process. In some embodiments, the printheads remain stationary while the support member and object moves past the printhead. In other embodiments, the printheads move while the support member remains stationary. In still other embodiments, both the printheads and the support member move.

As used herein, the term "cross-process direction" refers to a direction that is perpendicular to the process direction and in the plane of the support member. The ejectors in two or more printheads are registered in the cross-process direction to enable an array of printheads to form printed patterns of build material and support material over a two-dimensional planar region. During a three-dimensional object printing process, successive layers of build material and support material that are formed from the registered printheads form a three-dimensional object.

As used herein, the term "z-axis" refers to an axis that is perpendicular to the process direction, the cross-process direction, and to the plane of the support member in a three-dimensional object printer. At the beginning of the three-dimensional object printing process, a separation along the z-axis refers to a distance of separation between the support member and the printheads that form the layers of build material and support material. As the ejectors in the printheads form each layer of build material and support material, the printer adjusts the z-axis separation between the printheads and the uppermost layer to maintain a substantially constant distance between the printheads and the uppermost layer of the object during the printing operation. In many three-dimensional object printer embodiments, the z-axis separation between the printheads and the uppermost layer of printed material is maintained within comparatively narrow tolerances to enable consistent placement and control of the ejected drops of build material and support material. In some embodiments, the support member moves away from the printheads during the printing operation to maintain the z-axis separation, while in other embodiments the printheads move away from the partially printed object and support member to maintain the z-axis separation.

As used herein, the term "marking agent" refers to a material that forms a halftone printed image on a surface of a three-dimensional object. Examples of marking agents include one or more colors of phase-change inks, such as cyan, magenta, yellow, black (CMYK) ink colors or other colors that are suitable for use in a three-dimensional object printer. The phase-change ink is formed from a solid material at ambient temperatures and the printer heats the phase-change ink until the phase-change ink liquefies. The printer ejects drops of the liquefied phase-change ink onto an image receiving surface to form halftone printed images, including color images that combine different proportions of the CMYK or other selected ink colors to reproduce a wide range of visible colors. The phase change ink cools and solidifies on the image receiving surface to form the halftone printed image from a layer of material with a predetermined thickness.

As used herein, the term "color neutral marking agent" refers to a type of marking agent that does not substantially affect the perceived hue of a printed image when printed in combination with non-color neutral marking images that form a halftone printed image. Examples of color neutral marking agents include optically transparent marking agents and marking agents of a neutral color such as white or lighter shades of gray. In some embodiments, the color neutral marking agent is also a phase-change ink with the neutral color. A halftone printed image includes a combination of colored marking agents such as CMYK inks that are not color neutral. As described below, a printer ejects drops of the color neutral marking agent into pixel locations of the halftone image that do not receive any color marking agent to form a layer of marking agent with a uniform thickness over an entire region of an image receiving surface. The color neutral marking agent does not produce a substantial shift in hue for printed images formed from the color inks, such as shifting the perceptible printed colors of an image from red to green or to any other hue color.

The color neutral marking agent may affect other aspects of the printed images that are formed from non-color neutral marking agents such as the perceptible saturation, brightness, and lightness of the printed image. However, in a practical embodiment of an inkjet printer, the color neutral marking agent is a material that enables formation of layers of a three-dimensional printed object with a uniform thickness in conjunction with halftone printed patterns of non-color neutral marking agents that form printed images without a substantial negative impact on the quality of the printed images. Those of skill in the art should recognize that a black ink and darker gray marking agents meet the broadest requirements of a color neutral marking agent since the black ink does not produce a substantial shift in the hue of a printed image. However, for practical purposes black and dark gray inks are not considered a color neutral marking agents because these inks are commonly used in both monochrome and multicolor printed images. Additionally, the use of large amounts of dark inks in combination with other colored inks greatly reduces the visibility of the printed image with the colored ink because the perceived colors of printed inks behave according to a subtractive color model.

FIG. 1 depicts a three-dimensional object printer 100 that is configured to identify the z-axis distance between one or more printheads and a substrate in the printer 100. The printer 100 includes a support member 102, three printhead arrays 104A-104C, 108A-108C, and 112A-112C, support member actuator 124, leveler roller 118, controller 128, and a memory 132. In the printer 100, the printhead array 104A-104C ejects drops of a build material that forms layers in a three-dimensional printed object, such as the object 150 that is depicted in FIG. 1. The printhead array 108A-108C ejects drops of phase-change inks to form halftone printed patterns on either the surface of the support member 102 or on one or more surfaces of the three-dimensional printed object 150. In the configuration of FIG. 1, the printhead array 108A-108C includes multicolor printheads that eject drops of cyan, magenta, yellow, and black (CMYK) inks, although other embodiments use a single ink color for monochrome printing or use different ink color combinations. The printhead array 112A-112C ejects drops of the color neutral material, such as a transparent ink, a white or light gray primer material, or any other suitable color neutral material. While FIG. 1 depicts three printhead arrays, alternative embodiments can include a different arrangement and number of printhead arrays that form printed objects. For example, in an alternative embodiment the printer includes four separate printhead arrays that each ejects drops of one of the CMYK marking agent colors instead of using a single multi-color printhead array with the printheads 108A-108C.

In the printer 100, the support member 102 is a planar member, such as a metal plate, that moves in a process direction P. The printhead arrays 104A-104C, 108A-108C, and 112A-112C form a print zone 110. The support member 102 carries any previously formed layers of the support material and build material through the print zone 110 in the process direction P. During the printing operation, the support member 102 moves in a predetermined process direction path P that passes the printheads multiple times to form successive layers of a three-dimensional printed object, such as the object 150 that is depicted in FIG. 1B.

In the printer 100, an actuator 124 also moves the support member 102 along the z-direction axis (z) away from the printheads in the print zone 110 after application of each layer of material to the support member. In the printer 100, the actuator 124 is an electromechanical actuator, such as a stepper motor, that receives control signals from the controller 128 to move the support member 102 by predetermined distances along the z-axis. The print zone 110 forms an additional layer to the three-dimensional printed object or objects on each member during each circuit through the path to form multiple sets of three-dimensional objects in parallel.

The printhead arrays including the printheads 104A-104C and 108A-108C that eject material toward the support member 102 to form layers of a three-dimensional printed object, such as the object 150 that is depicted in FIG. 1B. Each of the printheads 104A-104C, 108A-108C, and 112A-112C includes a plurality of ejectors that eject liquefied drops of a build material or support material. In one embodiment, each ejector includes a fluid pressure chamber that receives the liquid build material, an actuator such as a piezoelectric actuator, and an outlet nozzle. The piezoelectric actuator deforms in response to an electric firing signal and urges the liquefied build material through the nozzle as a drop that is ejected toward the member 102. If the member 102 bears previously formed layers of a three-dimensional object, then the ejected drops of the build material form an additional layer of the object. Each of the printheads 104A-104C, 108A-108C, and 112A-112C includes a two-dimensional array of the ejectors, with an exemplary printhead embodiment including 880 ejectors. During operation, the controller 128 controls the generation of the electrical firing signals to operate selected ejectors at different times to form each layer of the build material for the object.

The controller 128 is a digital logic device such as a microprocessor, microcontroller, field programmable gate array (FPGA), application specific integrated circuit (ASIC) or any other digital logic that is configured to operate the printer 100. In the printer 100, the controller 128 is operatively connected to the actuator 124 that controls the movement of the support member 102. The controller 128 is also operatively connected to the printhead arrays 104A-104C, 108A-108C, and 112A-112C, and a memory 132. The controller 128 operates the ejectors in the printheads 104A-104C to form layers of build material and support material to form an object, such as the object 150. As described in more detail below, the controller 128 also performs a randomized halftone image data generation process to control the operation of the printheads 108A-108C to form halftone printed patterns with accurate color reproduction of contone color image data. The controller also operates the printheads 112A-112C to eject the color neutral material into regions of the halftone image that do not contain color marking agents to form the printed halftone image from a layer of material with uniform thickness.

In the embodiment of the printer 100, the memory 132 includes volatile data storage devices such as random access memory (RAM) devices and non-volatile data storage devices such as solid-state data storage devices, magnetic disks, optical disks, or any other suitable data storage devices. The memory 132 stores programmed instructions 136, 3D object image data 138, and contone image data 140. The contone image data 140 includes one or more two-dimensional images formed from encoded digital data in red/green/blue (RGB), hue/saturation/value (HSV), or other suitable contone color formats. The controller 128 executes the stored program instructions 136 to operate the components in the printer 100 to both form a three-dimensional printed object, such as the object 150 and to print one or more layers including halftoned images on the surface of the object 150. The 3D object image data 138 include, for example, a plurality of two-dimensional image data patterns that correspond to each layer of build material and support material that the printer 100 forms during the three-dimensional object printing process. The controller 128 ejects drops of material from the printheads 104A-104C with reference to each set of two-dimensional image data to form each layer of the object 150.

The memory 132 also stores contone image data 140 that correspond to printed images to be formed on the surface of the support member 102 as the base for a three-dimensional printed object 150, or on surfaces of the three-dimensional printed object 150. As described in more detail below, the controller 128 generates statistical halftone coverage area data for a halftone pattern that reproduces the contone image data and generates the halftone pattern using a randomized pixel assignment process that includes both color marking agent and color neutral marking agent. The controller 128 operates the ejectors in the color marking agent printheads 108A-108C to form the halftone printed pattern and the controller 128 operates the ejectors in the color neutral marking agent printheads 112A-112C to form the halftone printed image from a layer of material that has uniform thickness.

In the printer 10, the printheads 108A-108C and 112A-112C eject drops of a phase-change ink marking agent that land on the surface of the three-dimensional printed object 150 to form a halftone printed image. The phase-change ink includes both ink with colors, such as the CMYK inks, and color neutral inks including white, light gray, and transparent inks. The phase-change inks melt when raised to a predetermined operating temperature in the printer 100 and the inkjets in the printheads 108A-108C and 112A-112C eject liquefied drops of the phase-change ink onto different pixel locations on the surface of the object 150 in response to electrical firing signals from the controller 128. The phase-change ink remains on the surface of lower layers of build material or phase change ink that form the object 150. The phase-change ink remains in a semi-liquefied stated on the surface of the object 150 and a leveler roller 118 applies pressure and optionally heat to smooth the drops of phase-change ink into a printed halftone image that has a uniform thickness over the entire upper surface of the object 150. As described below, the printer 100 forms the halftone printed images with arrangements of both color and color-neutral marking agent to form printed images with accurate color reproduction and with uniform material thicknesses. During a printing operation, the printer 100 optionally continues printing additional layers of material including build material and phase-change ink layers to complete the object 150. The printer 100 forms each layer with a uniform thickness to provide support for additional layers of material in the object 150.

Figure 2:
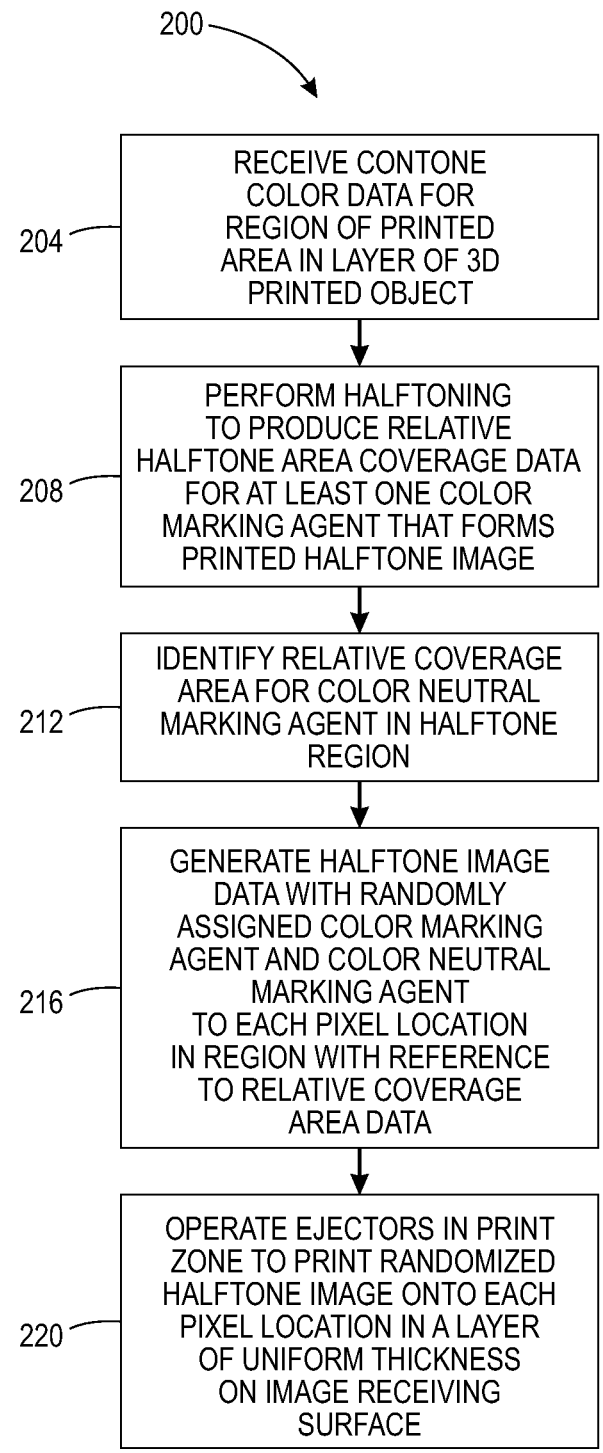
FIG. 2 is a block diagram of a process to form halftone printed images with uniform thicknesses on a surface of a three-dimensional object in the three-dimensional object printer of FIG. 1.

FIG. 2 depicts a block diagram of a process 200 for forming printed halftone patterns on an image receiving surface in a three-dimensional printer. In the discussion below, a reference to the process 200 performing a function or action refers to the operation of a controller that executes stored program instructions to perform the function or action in using other components in the three-dimensional object printer. In some configurations, the three-dimensional object printer performs the process 200 during a three-dimensional printing operation. The process 200 is described in conjunction with the three-dimensional object printer 100 of FIG. 1 for illustrative purposes.

Process 200 begins as the controller 128 receives contone color image data corresponding to a printed image that is formed as part of an object during a three-dimensional printing operation (block 204). As described above, the memory 132 stores contone image data 140 for one or more printed images that are formed as one or more layers of a three-dimensional printed object. The printed images are often formed on the exterior of the three-dimensional printed object, although some print jobs also form printed images in intermediate layers of a three-dimensional printed object. The contone image data 140 includes encoded digital data in RGB, HSV, or other suitable contone color formats. The controller 128 receives two-dimensional contone image data that forms a single layer in a larger three-dimensional printed object, and the printer 100 optionally performs process 200 multiple times during a three-dimensional printing operation to form multiple halftone printed images in an object. The memory 132 typically stores the contone color image data 140 as a two-dimensional arrangement of contone pixels that form an image. As described below, the controller 128 converts the contone pixels to a set of relative halftone coverage data for halftone patterns that reproduce the color values of each contone pixel. The controller 128 subsequently generates two-dimensional halftone image data corresponding to pixel locations on the image receiving surface that receive both color marking agents in a halftone printed pattern and color neutral marking agents to form a layer of the marking agent with uniform thickness over a region of the image receiving surface.

Process 200 continues as the printer 100 generates relative halftone coverage data for a halftone printed image that reproduces the colors in the contone image data (block 208). In the printer 100, the controller 128 uses a combination of hardware and software to perform a halftoning process that produces relative halftone coverage area statistics to enable the printer 100 to print a halftone image that reproduces the contone image data. The halftone process does not specify precise pixel locations of ink drops on the image receiving surface, but instead merely generates statistical information including the relative proportions of each marking agent. The controller 128 generates the relative halftone coverage area data for the color marking agents using a halftone process that is otherwise known to the art and is not described in more detail herein.

In the CMYK embodiment of the printer 100, the halftoning process generates relative halftone coverage area proportion data each of the cyan, magenta, yellow, and black inks to reproduce a contone color. While not a requirement for the operation of the printer 100, the controller 128 optionally identifies the relative halftone coverage area data as percentages for each of the marking agent colors in the printer 100 where the sum of the percentages never exceeds 100%. For example, in a CMYK configuration the halftone process generates relative coverage percentage data of C=10%, M=5%, Y=20%, and K=6% for each of the color marking agents.

During process 200, the controller 128 also identifies the relative halftone coverage data for a color neutral marking agent (block 212). The relative coverage area for the color neutral marking agent corresponds to a difference between the total area of the region that receives the halftone pattern and sum of the relative coverage area proportions for each of the color marking agents. For example, for C=10%, M=5%, Y=20%, and K=6%, the controller 128 identifies that the color marking agents cover 41% of the total area, and identifies that 59% (100%−41%) of the total area corresponds to the color neutral marking agent. The remaining 59% corresponds to portions of the region that do not otherwise receive color marking agents. The printer 100 ejects drops of the color neutral material for the pixel locations in the remaining 59% coverage area to form a layer of the marking agent having a uniform thickness on the image receiving surface.

The process 200 continues as the controller 128 generates halftone image data from the relative coverage area data to enable the printer 100 to form a halftone printed image that reproduces the colors in the contone image data (block 216). The controller 128 assigns one marking agent, either a color marking agent or the color neutral marking agent, to each pixel in the halftone image data in a weighted-random manner based on proportions of the relative coverage areas for each of the marking agents. In one configuration, the controller 128 uses a random number generator, such as a hardware or software random number generator that produces either true or pseudo-random numbers, to produce a random number in a predetermined range of 1 to 100. The random number corresponds to one of the marking agents the total predetermined numeric range of coverage percentages of the marking agents (e.g. C=1-10; M=11-15; Y=16-35; K=36-41; and the color neutral marking agent=42-100).

The controller 128 assigns the marking agent for the pixel location based on the value of the random number that corresponds to the numeric ranges of the marking agents (e.g. the pixel is assigned yellow for a random value of 31 or the color neutral marking agent for a value of 53). The relative proportional values of each type of marking agent determine the aggregate proportion of pixels that the controller 128 assigns to each type of marking agent, although the controller 128 assigns individual pixels at random instead of following a predetermined pattern of marking agents. During the process 200, the controller 128 performs the random number generation and weighted color assignment process for each pixel to assign one type of marking agent to each pixel location in the halftone image data.

In other embodiments, the controller 128 applies a different technique for random number generation and assignment based on the relative proportion of area coverage for each of the marking agents. Alternative embodiments represent the relative coverage area parameters for the color marking agents and color neutral marking agents using fixed point or floating point numeric representations that correspond to the relative proportions of each type of marking agent that reproduce a contone color in the halftone printed image. For example, alternative controller embodiments use a larger or smaller numeric range or assign floating point numbers in a predetermined range (e.g. 0.0 to 1.0) to the statistical coverage area proportions and random numbers to identify the type of marking agent that is assigned to each pixel in a random manner.

During process 200, the controller 128 operates the printhead ejectors in the print zone 110 to form a printed halftone image with the color marking agent and the color neutral marking agent that fully covers the region of the image receiving surface with a layer of the marking agents that has a uniform thickness (block 220). In the printer 100, the controller 128 operates the ejectors in the printheads 108A-108C to eject drops of the CMYK color marking agents onto pixel locations of the image receiving surface that receive color marking agent to form the halftone printed image. The controller 128 also operates the ejectors in the printheads 112A-112C to place the color neutral marking agent into the pixel locations that do not receive one of the color marking agents. The combination of the color marking agents and the color neutral marking agent forms a layer of the marking agent material with a uniform thickness that covers an entire region of the image receiving surface. The uniform layer forms a base that can receive additional layers of build material or layers of printed marking agent during a three-dimensional printing process.

Figure 3:
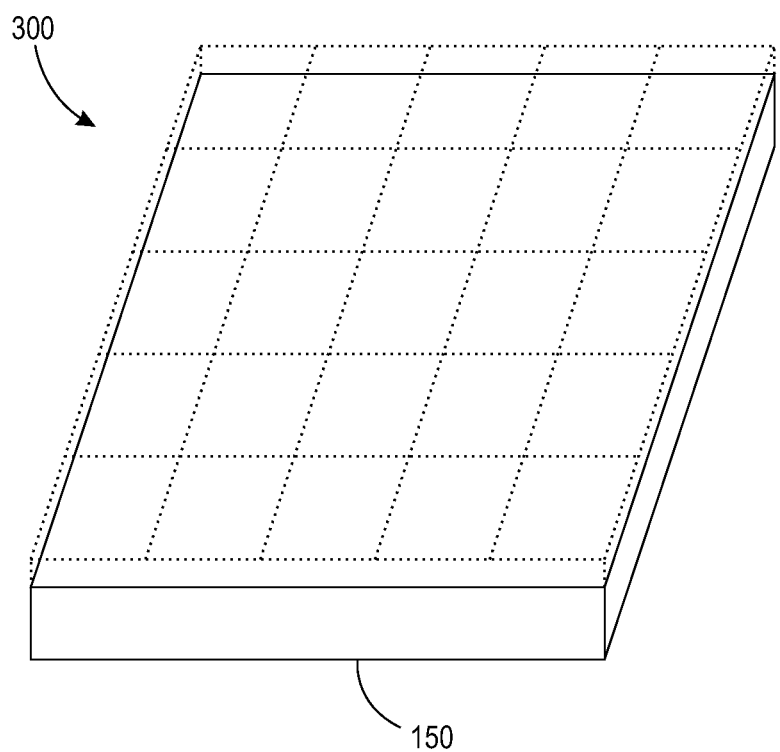
FIG. 3 is a depiction of pixel locations on a surface of a three-dimensional printed object in the three-dimensional object printer of FIG. 1.

FIG. 3 depicts the object 150 during the halftone printing process 200. In FIG. 3, the pixel locations 300 correspond to individual locations where the printer 100 ejects drops of a selected marking agent to form a layer of the marking agent that covers the surface of the object 150 with a uniform thickness. The controller 128 operates the ejectors in the printheads 108A-108C and 112A-112C to eject a single drop of marking agent onto each pixel location, although in other embodiments the printheads eject two or more drops to cover each pixel location to form a layer with uniform thickness from two or more types of marking agent.

While FIG. 3 depicts the region that includes the halftone printed image as covering an entire surface of the object 150, in alternative configurations the printer 100 only forms the halftone pattern on a region that covers a portion of the surface of the object 150. For example, to form a halftone printed image on a lateral side of a three-dimensional printed object with a flat or curved shape, the printer 100 forms the halftone printed image in a region that corresponds to a cross-section of the side of the object in each layer with a predetermined lateral thickness (e.g. 1-2 millimeters). The printer 100 forms the halftone images in the cross-sectional regions of one or more layers in the object 150 to produce a printed halftone image on sides of the object even if the sides of the object do not directly face the printheads in the print zone 110. The printer 100 prints drops of build material or support material onto the remaining portion of the surface of the surface 150 to produce a combined layer of the printed ink and build/support material that has a uniform thickness on the surface of the object 150.

As described above, the printer 100 selects the type of marking agent for each pixel location based on randomized halftone image data with weighted selections based on the proportions of different marking agent colors that are produced during the halftoning process. The remaining proportion of pixel locations that do not receive a color marking agent receive the color neutral marking agent to produce a combined layer of the marking agent with a uniform thickness where all of the pixel locations in the region of the image receiving surface are covered with a marking agent. The uniform layer provides a smooth surface to enable the printer 100 to form additional layers of build material or additional layers of the marking agent during a three-dimensional object printing operation.

In the illustrative example of FIG. 3, a surface of the three-dimensional printed object 150 form the image receiving surface for the marking agent in the halftone printed image. However, in another configuration the printer 100 forms the halftone printed image on the surface of the support member 102. The printer 100 subsequently ejects build material from the printheads 104A-104C to form one or more layers of a three-dimensional printed object over the printed halftone pattern. In this configuration the printer 100 forms a printed image on the side of the object that faces the support member 102 during the three-dimensional object printing process, and the printer 100 optionally forms halftone printed images on multiple surfaces of the object using the halftone printing process 200.

It will be appreciated that variants of the above-disclosed and other features and functions, or alternatives thereof, may be desirably combined into many other different systems, applications or methods. Various presently unforeseen or unanticipated alternatives, modifications, dispersions or improvements may be subsequently made by those skilled in the art that are also intended to be encompassed by the following claims.

What is claimed:

1. A method of operating a three-dimensional object printer comprising:
   receiving with a controller contone image data;
   generating with the controller relative halftone coverage data corresponding to proportions of each marking agent in a plurality of marking agents that form a halftone pattern on an image receiving surface that corresponds to the contone image data, the plurality of marking agents including at least a first color marking agent and a color neutral marking agent;
   generating with the controller halftone image data corresponding to each pixel location in a plurality of pixel locations on a region of the image receiving surface with reference to the relative halftone coverage data; and
   operating with the controller a plurality of ejectors in a print zone of the printer to eject one marking agent in the plurality of marking agents onto each pixel location in the plurality of pixel locations in the region of the image receiving surface with reference to the halftone image data to form a printed halftone image having a uniform thickness in the region of the image receiving surface, at least a first pixel location receiving the first color marking agent and at least a second pixel location receiving the color neutral marking agent.

2. The method of claim 1, the generation of the halftone image data further comprising:

generating with the controller the relative halftone coverage data including a first proportion corresponding to an amount of the first color marking agent color to produce the halftone pattern corresponding to the contone image data;

generating with the controller the relative halftone coverage data including a second proportion corresponding to an amount of the color neutral marking agent with reference to a proportion of the plurality of pixel locations in the region of the image receiving surface that does not correspond to any color marking agent in the plurality of marking agents; and generate randomized halftone image data with reference to the first proportion and the second proportion to cover each pixel location in the plurality of pixel locations with one of the plurality of marking agents.

3. The method of claim 2, the generation of the randomized halftone image data further comprising:

generating with the controller a random number in a predetermined range; and generating with the controller the first pixel location in the halftone image data corresponding to the first marking agent in response to the random number corresponding to the first proportion within the predetermined range.

4. The method of claim 1, the generation of the relative halftone coverage data and operation of the plurality of ejectors further comprising:

generating with the controller the relative halftone coverage data corresponding to proportions of a plurality of marking agents including a plurality of color marking agents and the color neutral marking agent to form the halftone pattern corresponding to the contone image data; and operating with the controller the plurality of ejectors to eject one marking agent in the plurality of marking agents onto each pixel location in the plurality of pixel locations in the region of the image receiving surface with reference to the halftone image data to form the printed halftone image having the uniform thickness in the region of the image receiving surface, at least a third pixel location in the plurality of pixel locations receiving a second color marking agent in the plurality of color marking agents.

5. The method of claim 4, the generation of the randomized halftone image data further comprising:

assign with the controller a portion of a predetermined numeric range to each color marking agent in the plurality of color marking agents with reference to a size of each proportion in the plurality of proportions for the plurality of color marking agents;

assigning with the controller another portion of the predetermined numeric range to the color neutral marking agent corresponding to a portion of the predetermined numeric range that is not assigned to any of the plurality of color marking agents;

generating with the controller a random value within the predetermined numeric range;

identifying with the controller one of the plurality of color marking agents or the color neutral marking agent in response to the random value being within a corresponding portion of the predetermined numeric range assigned to the identified marking agent; and generating with the controller the halftone image data with the identified marking agent in one pixel location in the plurality of pixel locations.

6. The method of claim 1, the operation of the plurality of ejectors further comprising:

operating with the controller the plurality of ejectors to form the halftone printed image on a surface of a support member in the three-dimensional object printer; and operating with the controller another plurality of ejectors to form a layer of a build material over the halftone printed image.

7. The method of claim 1, the operation of the plurality of ejectors further comprising:

operating with the controller the plurality of ejectors to form the halftone printed image on a surface of a three-dimensional printed object positioned in the print zone.

8. A three-dimensional object printer comprising:

a plurality of ejectors configured to eject drops of at least a first color marking agent and a color neutral marking agent onto an image receiving surface in a print zone;

a memory configured to store contone image data; and a controller operatively connected to the plurality of ejectors and the memory, the controller being configured to:

receive the contone image data from the memory;

generate relative halftone coverage data corresponding to proportions of each marking agent in the plurality of marking agents that form a halftone pattern on the image receiving surface that corresponds to the contone image data;

generate halftone image data corresponding to each pixel location in a plurality of pixel locations on a region of the image receiving surface with reference to the relative halftone coverage data; and operate the plurality of ejectors to eject one marking agent in the plurality of marking agents onto each pixel location in the plurality of pixel locations in the region of the image receiving surface with reference to the halftone image data to form a printed halftone image having a uniform thickness in the region of the image receiving surface, at least a first pixel location receiving the first color marking agent and at least a second pixel location receiving the color neutral marking agent.

9. The printer of claim 8, the controller being further configured to:

generate the relative halftone coverage data including a first proportion corresponding to an amount of the first color marking agent color to produce the halftone pattern corresponding to the contone image data;

generate the relative halftone coverage data including a second proportion corresponding to an amount of the color neutral marking agent with reference to a proportion of the plurality of pixel locations in the region of the image receiving surface that does not correspond to any color marking agent in the plurality of marking agents; and generate randomized halftone image data with reference to the first proportion and the second proportion to cover each pixel location in the plurality of pixel locations with one of the plurality of marking agents.

10. The printer of claim 9, the controller being further configured to:

generate a random number in a predetermined range; and generate the first pixel location in the halftone image data corresponding to the first marking agent in response to the random number corresponding to the first proportion within the predetermined range.

11. The printer of claim 8, the controller being further configured to:
generate the relative halftone coverage data corresponding to proportions of a plurality of marking agents including a plurality of color marking agents and the color neutral marking agent to form the halftone pattern corresponding to the contone image data; and
operate the plurality of ejectors to eject one marking agent in the plurality of marking agents onto each pixel location in the plurality of pixel locations in the region of the image receiving surface with reference to the halftone image data to form the printed halftone image having the uniform thickness in the region of the image receiving surface, at least a third pixel location in the plurality of pixel locations receiving a second color marking agent in the plurality of color marking agents.

12. The printer of claim 11, the controller being further configured to:
assign a portion of a predetermined numeric range to each color marking agent in the plurality of color marking agents with reference to a size of each proportion in the plurality of proportions for the plurality of color marking agents;
assign another portion of the predetermined numeric range to the color neutral marking agent corresponding to a portion of the predetermined numeric range that is not assigned to any of the plurality of color marking agents;
generate a random value within the predetermined numeric range;
identify with the controller one of the plurality of color marking agents or the color neutral marking agent in response to the random value being within a corresponding portion of the predetermined numeric range assigned to the identified marking agent; and
generate the halftone image data with the identified marking agent in one pixel location in the plurality of pixel locations.

13. The printer of claim 8, the controller being further configured to:
operate the plurality of ejectors to form the halftone printed image on a surface of a support member in the three-dimensional object printer; and
operate another plurality of ejectors to form a layer of a build material over the halftone printed image.

14. The printer of claim 8, the controller being further configured to:
operate the plurality of ejectors to form the halftone printed image on a surface of a three-dimensional printed object positioned in the print zone.

* * * * *